United States Patent [19]
Aoki

[11] Patent Number: 5,544,900
[45] Date of Patent: Aug. 13, 1996

[54] MANIFOLD GASKET WITH DEFORMATION ABSORBING MECHANISM

[75] Inventor: Katsuji Aoki, Tokyo, Japan

[73] Assignee: Ishikawa Gasket Co., Ltd., Tokyo, Japan

[21] Appl. No.: 355,268

[22] Filed: Dec. 12, 1994

[30] Foreign Application Priority Data

Dec. 16, 1993 [JP] Japan .................... 5-67217 U

[51] Int. Cl.$^6$ ........................................ F16J 15/08
[52] U.S. Cl. .................. 277/235 B; 277/180; 277/236
[58] Field of Search ........................ 277/180, 235 B, 277/236, 207 R, 235 R, DIG. 9

[56] References Cited

U.S. PATENT DOCUMENTS

| | | | |
|---|---|---|---|
| 3,817,540 | 6/1974 | Nicholsen | 277/180 |
| 4,387,904 | 6/1983 | Nicholson . | |
| 4,416,190 | 11/1983 | Ishizuka . | |
| 4,676,514 | 6/1987 | Beutter et al. | 277/235 B |
| 4,714,260 | 12/1987 | Udagawa . | |
| 4,728,110 | 3/1988 | Nakasone . | |
| 4,896,891 | 1/1990 | Udagawa | 277/235 B |
| 5,087,058 | 2/1992 | Miura et al. | 277/235 B |
| 5,092,613 | 3/1992 | Udagawa . | |
| 5,232,229 | 8/1993 | Udagawa | 277/180 |
| 5,393,076 | 2/1995 | Hagiwara | 277/235 B |

FOREIGN PATENT DOCUMENTS 59-110471  7/1984  Japan .

*Primary Examiner*—Daniel G. DePumpo
*Attorney, Agent, or Firm*—Kanesaka & Takeuchi

[57] ABSTRACT

A manifold gasket of the invention is used for sealing around manifold holes of a manifold, wherein at least three manifold holes are arranged side by side. The gasket is formed of a first metal plate extending around the manifold holes to constitute a manifold gasket, and two spacers attached to two longitudinal end portions of the plate. The first metal plate includes first holes corresponding to the respective manifold holes, and beads situated around the respective first holes for sealing therearound. Each spacer includes a second hole greater than an outer shape of the bead to allow the bead to be situated inside the second hole. The thickness of the spacer is less than the height of the bead. Thus, the manifold gasket can be securely fixed to an engine part through the spacers without creep relaxation of the beads, while the bead not surrounded by the spacer absorbs deformation of the manifold by heat.

6 Claims, 2 Drawing Sheets

MANIFOLD GASKET WITH DEFORMATION ABSORBING MECHANISM

BACKGROUND OF THE INVENTION AND RELATED ART STATEMENT

The present invention relates to a manifold gasket with a deformation absorbing mechanism, which can securely seal around manifold holes without being substantially affected by expansion and retraction of the manifold by heat.

A manifold attached to an internal combustion engine is exposed to high temperature by exhaust gas when the engine is actuated, while the manifold is cooled to an ambient temperature when the engine is stopped. Namely, the manifold is expanded and contracted cyclically by heat of the engine whenever the engine is operated and stopped. Thus, it is not easy to securely seal around the manifold holes by a manifold gasket. Also, in case sealing portions for the adjacent holes of the manifold gasket are connected together to form one manifold gasket, the manifold gasket may deform by heat to cause a sealing problem.

A conventional manifold M and a gasket G for use in a four cylinder engine are shown in FIGS. 1 and 2. The manifold M is formed of a main portion 10 and four branched portions 11. Inlet portions 12 of the branched portions 11 are attached to outlet ports or portions 13 of an engine 14, and are connected together by bolts 15.

The branched portions 11 of the manifold M are united together at the inlet portions 12 by flanges 16 to facilitate attaching operation of the manifold M to the engine 14. Also, the gasket G includes sealing portions 17 attached to the inlet portions 12, which are connected together by flanges 18. The shapes of the sealing portions 17 and the flanges 18 of the gasket G substantially correspond to those of the inlet portion 12 and the flange 16 of the manifold M.

When the engine 14 with the manifold M and the gasket G is actuated, the manifold M is heated to high temperature by exhaust gas, while the engine 14 is not so heated due to a cooling system of the engine. Thus, the flanges 16 of the manifold M expand in the longitudinal direction, as shown in arrows 19, and the center area of the manifold M is pushed toward the engine 14, as shown in an arrow 20. Therefore, the gasket G suffers damage at the sealing surfaces due to the movement between the inlet portions 12 and the outlet portions 13 whenever the engine is operated and stopped, so that the sealing ability of the gasket G decreases.

In order to resolve the problems of the conventional gasket, a gasket G' as shown in FIG. 3 was proposed in Japanese Utility Model Publication (KOKAI) No. 59-110471. The gasket G' is formed of an upper plate 21 with spacers 22 at longitudinal ends, a middle plate 23 with beads 24, 24' for sealing around the manifold holes, and a lower plate 25 situated under the middle plate 23.

When the gasket G' is installed, the beads 24 are compressed strongly by the spacers 22, but the beads 24' are only slightly compressed. When the center area of the manifold M is pushed toward the engine due to heat as explained before, the beads 24' can be compressed to absorb the deformation of the manifold M. Thus, damages and decrease of the sealing ability of the gasket G' are prevented.

However, in the above gasket G', since the beads 24 are always compressed strongly by the spacers 22, the beads 24 receive surface pressure stronger than that at the beads 24'. Thus, the beads 24 suffer deformation by heat, so that the beads 24 may not properly seal for a long usage.

On the other hand, in order to adjust a surface pressure of a bead, an auxiliary plate may be installed on a plate with the bead, for example as disclosed in U.S. Pat. No. 4,728,110. Namely, the auxiliary plate is located adjacent to the bead so that the bead is not fully compressed and the compression force to the bead is applied to the auxiliary plate.

However, there is no manifold gasket for properly sealing around the manifold holes while preventing creep relaxation of the beads and absorbing deformation of the manifold.

The present invention has been made in view of the above drawbacks, and an object of the invention is to provide a manifold gasket with a good sealing ability for a long usage.

Another object of the invention is to provide a manifold gasket as stated above, which can properly absorb deformation of manifold flanges of a manifold though the manifold flanges attached to the manifold are deformed due to heat in operating an engine.

A further object of the invention is to provide a manifold gasket as stated above, which can be manufactured easily and economically.

Further objects and advantages of the invention are apparent from the following description of the invention.

SUMMARY OF THE INVENTION

A manifold gasket of the invention is installed between an engine, i.e. a cylinder head, and a manifold, and is used for sealing around manifold holes. The manifold has at least three manifold holes arranged side by side, preferably in a row. The manifold gasket is basically formed of a first metal plate extending around the manifold holes, and two spacers attached to two longitudinal ends of the first metal plate. Namely, the spacer is not attached to a center area of the gasket.

The first metal plate includes first holes corresponding to the respective manifold holes, and beads situated around the respective first holes for sealing therearound. Each spacer includes a second hole greater than the outer shape of the bead to allow the bead to be situated inside the second hole when the spacer is attached to the first metal plate. The thickness of the spacer is less than the height of the bead.

When the manifold gasket is tightened between the manifold and the engine, the beads surrounded by the spacers are compressed to the thickness of the spacer. The bead not surrounded by the spacer is tightened to substantially the same level as in the beads at the longitudinal ends. Thus, the beads are not excessively compressed and securely seal around the manifold holes. Creep relaxation of the beads is substantially prevented. When the center area of the gasket is pushed by expansion of the manifold, the bead not surrounded by the spacer is compressed to absorb deformation of the manifold. The expansion and contraction of the manifold by heat is compensated or adjusted by the bead.

Especially, when the manifold includes manifold flanges for connecting branched portions of the manifold, the center area of the gasket is pushed to the engine portion. The gasket of the invention can properly absorb the deformation of the manifold flanges.

The first metal plate and the spacers have bolt holes around the respective manifold holes, and are connected to the engine and the manifold by bolts passing through the bolt holes. In addition, the spacers may be fixed to the first metal plate by spot welding.

The manifold gasket may further include a second metal plate situated on the first metal plate and the spacers to constitute a metal laminate gasket. Preferably, a third metal plate is situated under the first metal plate. The third metal plate may include curved portions around the respective manifold holes and edge portions around the curved portions. The edge portions are turned and situated on portions around holes of the second metal plate to surround the manifold holes by the curved portions.

DETAILED DESCRIPTION OF PREFERRED EMBODIMENTS

Figure 1:
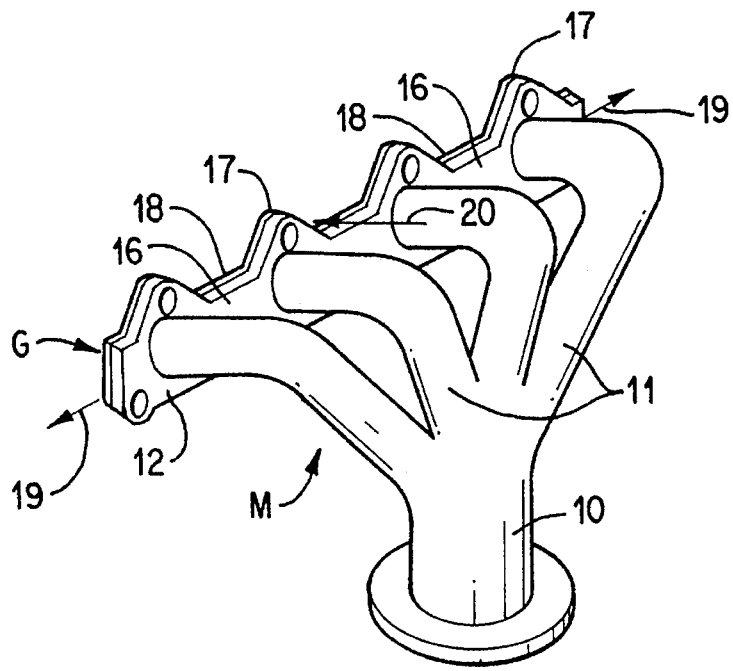
FIG. 1 is a perspective view of a conventional manifold with a gasket thereon.
Figure 2:
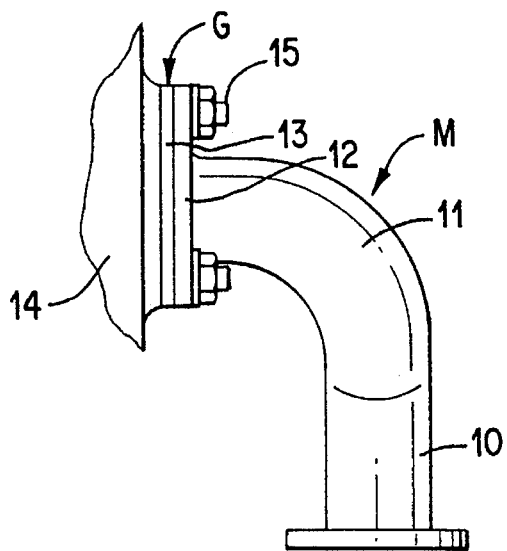
FIG. 2 is an explanatory side view of the manifold with the gasket shown in FIG. 1, which is attached to an engine.
Figure 3:
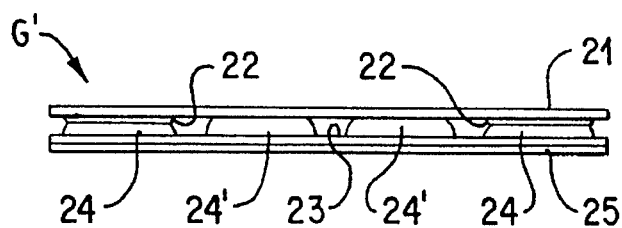
FIG. 3 is a side view of a conventional manifold gasket.
Figure 4:
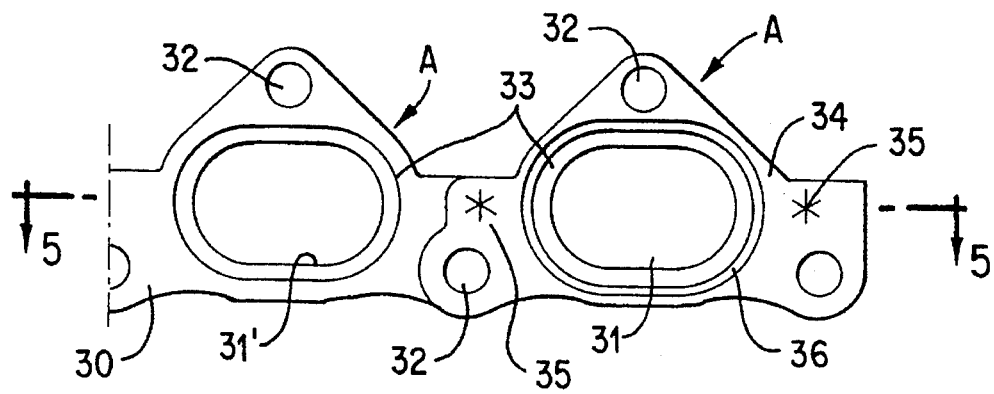
FIG. 4 is a plan view of a part of a first embodiment of a manifold gasket of the invention.
Figure 5:
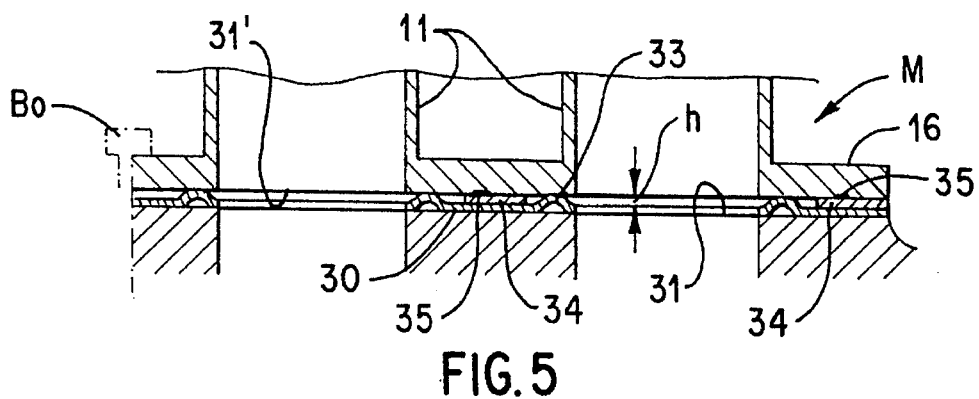
FIG. 5 is a section view of the manifold gasket taken along a line 5—5 in FIG. 4, wherein the gasket is compressed between a manifold and a cylinder head.

Referring to FIGS. 4 and 5, a first embodiment A of a manifold gasket of the invention is shown. A manifold, to which the gasket A is attached, is a conventional manifold M as shown in FIGS. 1 and 2, and includes the branched portions 11, inlet portions 12 and manifold flanges 16 for connecting the inlet portions 12, as explained before. When the engine with the manifold M is operated, the manifold M is heated. Thus, the flanges 16 are urged to expand laterally as shown in arrows 19 and the center area of the flanges 16 projects toward the engine as shown in arrow 20.

The manifold gasket A is formed of one metal plate 30 having holes 31, 31' and bolt holes 32 corresponding to manifold holes and bolt holes for the engine and the manifold M. Beads 33 are formed around the holes 31, 31' to seal therearound when compressed. Spacers 34 are fixed to the longitudinal end portions of the plate 30 by spot welding 35.

The spacer 34 includes a central hole 36 greater than the outer shape of the bead 33 and three bolt holes corresponding to the bolt holes 32. The shape of the spacer substantially corresponds to the shape of a part of the plate 30. The thickness of the spacer 34 is less than the height of the bead 33.

In the present invention, the manifold gasket A is used for a four cylinder engine. Thus, two spacers 34 are fixed to the plate 30 around the holes 31 located at the longitudinal end portions thereof, and the spacers 34 are not formed around two holes 31' located between the holes 31.

When the gasket A is installed, the gasket A is situated between the manifold M and the cylinder head. Bolts Bo pass through the holes of the manifold M and gasket A, and are fixed to the cylinder head. The bolts Bo passing through the spacers 34 are securely tightened, but the bolts Bo which do not pass through the spacers 34 are tightened not to excessively compress the beads 33. Namely, all the beads 33 are compressed substantially at the same level.

Since the spacers 34 are provided, even if the bolts Bo passing through the spacers 34 are strongly tightened, the beads 33 inside the spacers 34 are compressed to the height h corresponding to the thickness of the spacer 34 and are not excessively compressed. Thus, creep relaxation of the beads inside the spacer 34 is prevented if used for a long time. Although the beads which are not surrounded by the spacer 34 are not compressed strongly, the beads can securely seal around the manifold holes, and creep relaxation of the beads is prevented.

When the engine is actuated, the manifold is urged to expand in the lateral direction by the heat of the exhaust gas. However, since the longitudinal ends of the manifold M are securely connected to the engine by the bolts together with the gasket A, the manifold M does not substantially move laterally. Accordingly, the central area of the manifold M projects toward the engine due to the heat. Since the beads at the central area are not surrounded by the spacers 34 and can be compressed further, the beads are compressed by the expansion of the manifold M. Thus, the deformation of the manifold due to heat can be properly absorbed by the gasket A. The gasket can securely seal around the manifold holes by the beads.

When the engine is stopped and cooled, the expanded manifold and the compressed beads return to the original shapes. Thus, when the engine is heated and cooled, the gasket does not slide relative to the engine and the manifold to thereby avoid sliding damage relative to these members.

Figure 6:
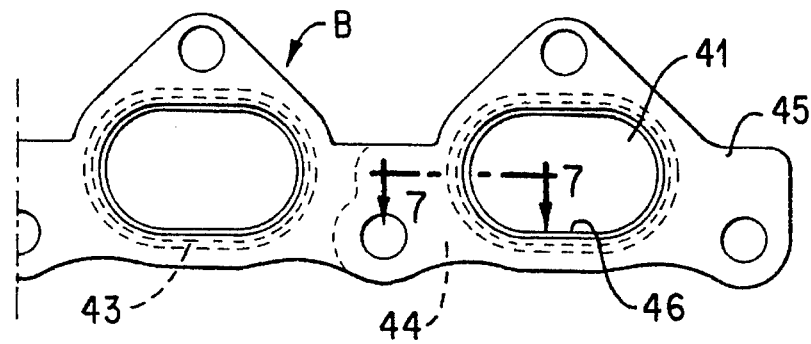
FIG. 6 is a plan view of a part of a second embodiment of a manifold gasket of the invention.
Figure 7:
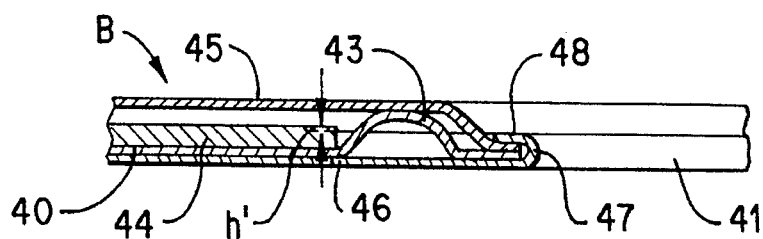
FIG. 7 is an enlarged section view taken along a line 7—7 in FIG. 6.

A second embodiment B of the manifold gasket of the invention is shown in FIGS. 6 and 7. The gasket B includes a metal plate 40 with beads 43, and two spacers 44, which operate as in the plate 30 and the spacers 34 of the gasket A. The gasket B further includes an upper plate 45, and a lower plate 46 with a curved portion 47 and a flange 48 around a hole 41. The curved portion 47 defines the hole 41, and the flange 48 is located above an edge of the upper plate 45. The plate 40 with the beads 43 is substantially covered by the upper and lower plates 45, 46. Thus, the plate 40 with the bead 43 is not directly exposed to the exhaust gas. Namely, deformation of the bead 43 by heat, i.e. creep relaxation, is reduced.

In the gasket B, the thickness of the spacer 44 is less than the height of the bead 43, but greater than a total thickness of the gasket B at the flange 48. Thus, when the gasket B is tightened, the bead 43 is compressed to the thickness of the spacer 44 to seal around the hole 41. Also, the gasket B can absorb the deformation of the manifold. The gasket B operates as in the gasket A.

In the present invention, the spacers are formed at the longitudinal end portions of the manifold gasket. The gasket is tightened strongly at the longitudinal end portions, while the beads in the center area of the gasket are tightened to be slightly compressed. Thus, creep relaxation of the beads is prevented, and the deformation of the manifold protruding toward the engine is absorbed by the beads. Since the gasket does not slide relative to the manifold and the engine, scratch or damage are not formed on the surfaces of the gasket.

While the invention is explained with reference to the specific embodiments of the invention, the explanation is illustrative, and the invention is limited only by the appended claims.

What is claimed is:

1. A manifold gasket for sealing around manifold holes of a manifold, said manifold having at least three manifold holes arranged side by side, comprising:

a first metal plate extending around the manifold holes to constitute a manifold gasket, said first metal plate having first holes corresponding to the respective manifold holes and containing two end holes and at least one center hole, and beads situated around the respective first holes for sealing therearound and containing two end beads situated around the two end holes and at least one center bead situated around said at least one center hole, and two spacers attached to two longitudinal end portions of the first metal plate, each spacer having a second hole greater than an outer shape of each bead to allow the bead to be situated inside the second hole, and a thickness shorter than a height of the bead, each of said two spacers being situated around each of said two end beads so that the manifold gasket can be securely fixed to an engine part through the spacers without creep relaxation of the two end beads while the at least one center bead not surrounded by the spacer absorbs deformation of the manifold by heat.

2. A manifold gasket according to claim 1, wherein said first metal plate and the spacers have bolt holes around the respective manifold holes, and are adapted to be connected to the engine part and the manifold by bolts passing through the bolt holes.

3. A manifold gasket according to claim 2, wherein said first metal plate includes flanges between the first holes, said spacer extending at least to a middle of the flange.

4. A manifold gasket according to claim 1, further comprising a second metal plate situated on the first metal plate and the spacers to constitute a metal laminate gasket.

5. A manifold gasket according to claim 4, further comprising a third metal plate situated under the first metal plate, said third metal plate having curved portions around the respective manifold holes and edge portions around the curved portions, said edge portions being situated on portions around holes of the second metal plate.

6. A manifold gasket according to claim 5, wherein the thickness of the spacer is greater than a thickness of the gasket at the portion around the manifold hole.

* * * * *